(12) United States Patent
Kamikuri et al.

(10) Patent No.: US 9,127,185 B2
(45) Date of Patent: Sep. 8, 2015

(54) WATERBORNE MID-COAT PAINT COMPOSITION

(75) Inventors: Yoshimasa Kamikuri, Yokohama (JP); Atsushi Takahashi, Yokohama (JP); Satoru Ihara, Saitama-ken (JP)

(73) Assignees: BASF Japan Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/111,064

(22) PCT Filed: Apr. 3, 2012

(86) PCT No.: PCT/IB2012/000682
§ 371 (c)(1),
(2), (4) Date: Dec. 5, 2013

(87) PCT Pub. No.: WO2012/143767
PCT Pub. Date: Oct. 26, 2012

(65) Prior Publication Data
US 2014/0316042 A1   Oct. 23, 2014

(30) Foreign Application Priority Data
Apr. 19, 2011   (JP) .................................. 2011-092863

(51) Int. Cl.
| | |
|---|---|
| *C09D 167/02* | (2006.01) |
| *C09D 167/00* | (2006.01) |
| *C08L 61/32* | (2006.01) |
| *C08L 71/02* | (2006.01) |

(52) U.S. Cl.
CPC ............ *C09D 167/02* (2013.01); *C09D 167/00* (2013.01); *C08L 61/32* (2013.01); *C08L 71/02* (2013.01)

(58) Field of Classification Search
USPC ........................................................ 524/377
See application file for complete search history.

(56) References Cited

U.S. PATENT DOCUMENTS

| | | | |
|---|---|---|---|
| 8,034,877 B2 | 10/2011 | Adachi et al. | |
| 2003/0212192 A1* | 11/2003 | Yuan et al. | 524/502 |

FOREIGN PATENT DOCUMENTS

| | | |
|---|---|---|
| CN | 101374920 | 2/2009 |
| JP | 2883960 B2 | 4/1999 |
| JP | 2005034807 A | 2/2005 |
| JP | 2006265310 A | 10/2006 |
| JP | 2010248326 A | 11/2010 |
| WO | WO2010119317 A1 | 10/2010 |

OTHER PUBLICATIONS

International Preliminary Report on Patentability for International Application No. PCT/IB2012/000682 issued Oct. 22, 2013, 7 pages.
International Search Report for International Application No. PCT/IB2012/000682 mailed May 24, 2012, 3 pages.
Written Opinion for International Application No. PCT/IB2012/000682 mailed May 24, 2012, 5 pages.

\* cited by examiner

*Primary Examiner* — Robert Harlan
(74) *Attorney, Agent, or Firm* — Servilla Whitney LLC

(57) ABSTRACT

Composition comprising a polyester resin (A) made waterborne by adding 7-20 mass %, based on resin solids content of (A), of (a) a $C_{1-3}$ alkoxy group-containing glycol monoalkyl ether to a polyester resin of resin acid value 25-35 mgKOH/g and neutralizing with a secondary amine and/or tertiary amine; a melamine resin (B) comprising methylated melamine resin and methyl/butyl mixed alkylated melamine resin, the content ratio based on resin solids content by mass of the methylated melamine resin to the methyl/butyl mixed alkylated melamine resin from 50/50 to 90/10, and the content ratio based on resin solids content by mass of component (A) to component (B) is 70/30 to 90/10, and a polypropylene glycol (C) comprising a number average molecular weight between 400 and 1,200, and in a mass percentage between 1 and 10 mass % in terms of the combined resin solids contents by mass of component (A) and component (B).

3 Claims, No Drawings

WATERBORNE MID-COAT PAINT COMPOSITION

CROSS REFERENCE TO RELATED APPLICATIONS

This application is a National Phase Application of Patent Application PCT/IB2012/000682 filed on 3 Apr. 2012, which claims priority to JP 2011-092863, filed 19 Apr. 2011, both of which are hereby incorporated by reference in their entirety.

TECHNICAL FIELD

The present invention relates to a waterborne mid-coat paint composition which provides paint films that have outstanding painting performance (especially in terms of sagging resistance) and that are smooth and have a high-quality appearance; and, in particular, it relates to a waterborne mid-coat paint composition for motor vehicles.

BACKGROUND OF THE INVENTION

In recent years waterborne paints which employ water as a diluent have become the focus of attention from the viewpoint of air pollution prevention and saving resources and, for example, a mixture of a carboxyl group-containing polyester resin and an aminoplast resin is used in bake-curing type waterborne paints. In the field of mid-coat paints for motor vehicles, in order to confer a sense of being high-class, a high quality of appearance which is attractive to the eye is required, along with which chipping resistance is demanded for protecting the paint material from the impact of small stones and the like, and recently such quality requirements have been steadily increasing so that paint films of excellent painting performance and free of sagging, and which possess excellent smoothness have come to be demanded.

As an example of a novel waterborne mid-coat paint which has a painting performance (in terms of bubble and sag resistance properties) as good as or superior to organic solvent type mid-coat paints, and which is valuable in providing finished paint films of excellent smoothness and top-coat glossiness, there is known a waterborne mid-coat paint in which the chief components are (A) a polyester resin of acid value 10-100, hydroxyl group value 20-300 and number average molecular weight 800 to 10,000, (B) an aqueous amino resin, (C) a linear low molecular weight polyester diol comprising cyclohexanedimethanol and an aliphatic saturated dibasic acid, which has a number average molecular weight of 300-800 and which contains a primary hydroxyl group at both chain ends, and (D) a benzoin alkyl ether (see, for example, JP 2883960). However, this waterborne mid-coat paint has the disadvantage that sagging tends to arise when subjected to pre-heating prior to curing.

Moreover, as a method for obtaining a mid-coat paint film which is outstanding in its hiding properties, chipping resistance and water resistance, and which is free of paint film defects such as sagging and bubbling, there is known a method for forming a paint film using a waterborne paint which includes a hydroxyl group-containing resin, a curing agent comprising a blocked polyisocyanate compound, and/ or a melamine resin, and flake-shaped pigment, where the substrate is coated to a coating thickness of 20-35 μm under conditions comprising a solids content at the time of application of 45-70 wt %, a paint viscosity adjusted such that the viscosity at 20° C. is 50-90 seconds measured with a Ford Cup #4, a painting booth temperature of 15-40° C., and a painting booth humidity of 60-90%, and where the viscosity ($\eta$) 1 minute following coating is 2000-6000 mPa·sec (20° C., shear rate 2.0/sec) (see, for example, JP-A-2005-034807). However, with this paint film forming method there is the disadvantage that, where the painting booth temperature/humidity comprises a high temperature and low humidity, the coated film viscosity is too high and good smoothness is not obtained.

Again, as a waterborne mid-coat motor vehicle paint having outstanding chipping resistance, which is free from paint film sagging, and gives an excellent finish, there is known a waterborne mid-coat paint for motor vehicles containing (A) a urethane resin aqueous dispersion of resin acid value 2-20 mg/KOH/g, (B) a hydroxyl group-containing resin, and (C) a crosslinking agent, where said urethane resin aqueous dispersion (A) is formed by reacting a polyisocyanate and a polyol having at least two hydroxyl groups per molecule comprising a polyetherpolyol, a polyesterpolyol, a compound having at least one carboxyl group and at least two hydroxyl groups, and, optionally, another polyol, to form a urethane prepolymer, which is neutralized with a neutralizing agent, and then stably dispersed in an aqueous medium (see, for example, JP-A-2006-265310). However, urethane resins are expensive when compared to other resins such as polyesters, and a cheaper method for obtaining a paint material which is outstanding in its appearance and painting performance is desired.

Furthermore, a waterborne mid-coat paint composition is known which includes (A) a water-soluble or water-dispersible polyester resin which is a polyester resin containing, in the resin, 2-10 mass % of linear or branched polyethylene glycol groups or polyethylene glycol ether groups with a number average molecular weight of 300-600, and containing carboxylic acid secondary or tertiary amine salt groups obtained by neutralizing at least some of the carboxylic acid groups in the resin with a secondary or tertiary amine, and which has a combined total of 0.8 to 1.2 of said polyethylene glycol groups or polyethylene glycol ether groups plus said carboxylic acid secondary or tertiary amine salt groups per number average molecular weight of the resin, and the acid value of the polyester resin prior to neutralization of the carboxylic acid groups with the said secondary or tertiary amine is no more than 30 mgKOH/g, the hydroxyl value is 90-160 mgKOH/g and the number average molecular weight is 1,300-1,900, and (B) a melamine resin as the curing agent, and the ratio by mass of the resin solids content of component (A) to that of component (B) is between 75/25 and 90/10 (see, for example, JP-A-2010-248326). However, with this waterborne mid-coat paint composition, the sagging resistance is inadequate when the painting booth temperature/humidity comprises a high temperature and low humidity, and so a method for obtaining a constant painting quality under still broader temperature and humidity conditions is desired.

The present invention provides a waterborne mid-coat paint composition which exhibits very little change in painting performance (in particular, sagging resistance) and appearance along with change in coating conditions like the temperature and humidity in the painting booth, and by means of which a constant painting quality can be obtained over wide-ranging coating conditions.

SUMMARY OF THE INVENTION

Specifically, the present invention relates to a waterborne mid-coat paint composition which contains, as indispensible components, (A) a water-soluble or water-dispersible polyester resin, (B) a melamine resin, and (C) polypropylene glycol, where said component (A) is a polyester resin which has been rendered waterborne by adding 7-20 mass %, based on the resin solids content of component (A), of (a) a $C_{1-3}$ alkoxy group-containing glycol monoalkyl ether to a polyester resin of resin acid value 25-35 mgKOH/g and then neutralizing with a secondary amine and/or tertiary amine, and said component (B) comprises a methylated melamine resin and a methyl/butyl mixed alkylated melamine resin, and the ratio based on resin solids content by mass of the methylated melamine resin to the methyl/butyl mixed alkylated melamine resin is between 50/50 and 90/10, and the ratio based on resin solids content by mass of component (A) to component (B) is from 70/30 to 90/10, and said component (C) has a number average molecular weight of between 400 and 1,200 and the content of component (C), by mass percentage, is between 1 and 10 mass % in terms of the combined resin solids contents by mass of component (A) and component (B).

Furthermore, the present invention provides a waterborne mid-coat paint composition where, in the above waterborne mid-coat paint composition, the content ratio by mass of the methylated melamine resin to the methyl/butyl mixed alkylated melamine resin in aforesaid component (B), based on solids content, is between 60/40 and 80/20.

Moreover, the present invention also provides a waterborne mid-coat paint composition where, in the above waterborne mid-coat paint composition, the number average molecular weight of aforesaid component (C) is between 900 and 1,100.

DETAILED DESCRIPTION OF A PREFERRED EMBODIMENT OF THE INVENTION

By employing the waterborne mid-coat paint composition of the present invention it is possible to obtain paint films of good painting performance (in particular, sagging resistance) and good appearance, even when the temperature and humidity conditions in the painting booth are markedly changed.

Below, a detailed explanation is provided of the waterborne mid-coat paint composition in the present invention.

The water-soluble or water-dispersible polyester resin (A) of the present invention is obtained by adding 7-20 mass %, in terms of the resin solids content of component (A), of (a) a glycol monoalkyl ether containing a $C_{1-3}$ alkoxy group to a polyester resin of resin acid value 25-35 mgKOH/g, and then neutralizing with a secondary amine and/or tertiary amine, so that it is rendered waterborne.

The resin acid value of the aforesaid starting material polyester resin is 25-35 mgKOH/g, and more preferably 25-30 mgKOH/g.

If the resin acid value exceeds 35 mgKOH/g, as well as the sagging resistance being lowered, there may also be a reduction in the paint film water resistance. On the other hand, if the resin acid value is less than 25 mgKOH/g, there may be a lowering in the stability of the water-soluble or water-dispersible polyester resin.

Furthermore, in terms of the curing properties and water resistance, the hydroxyl value of the water-soluble or water-dispersible polyester resin (A) of the present invention is preferably from 90 to 160 mgKOH/g, and, in terms of the polyester resin stability and ease of achieving the waterborne state, the number average molecular weight is preferably from 1,300 to 2,300. The number average molecular weight in the present invention is that determined from measurement data based on GPC in THF using polystyrene standards.

The aforesaid polyester resin starting material can be obtained by means of an esterification reaction between a carboxylic acid and/or carboxylic acid anhydride, and a compound containing hydroxyl groups.

The method of synthesizing the polyester resin starting material is not particularly restricted and can be conducted in accordance with normal procedure; for example, the synthesis can be performed by heating the components which constitute the raw materials at 100-250° C. for between 6 and 15 hours in a nitrogen atmosphere, to bring about an esterification reaction between the carboxylic acid groups and the hydroxyl groups. Reaction may be carried out with all the reaction components added in one go, or the reaction can be performed as a multistage reaction with part of the reaction components first being added and made to react, after which reaction with the remainder of the components is carried out. Furthermore, a known catalyst may be used to promote esterification at this time.

Normally, a polycarboxylic acid is used as the carboxylic acid employed in the polyester resin synthesis but, where required, a monobasic fatty acid or the like may also be used. Examples of the polycarboxylic acid are compounds having at least two carboxyl groups per molecule, such as phthalic acid, isophthalic acid, tetrahydrophthalic acid, tetrahydroisophthalic acid, tetrahydroterephthalic acid, hexahydrophthalic acid, hexahydroisophthalic acid, hexahydroterephthalic acid, trimellitic acid, adipic acid, sebacic acid, succinic acid, azelaic acid, fumaric acid, maleic acid, itaconic acid, pyromellitic acid, dimer acid, and the like, and these can be employed on their own or a combination of two or more may be used together.

The polycarboxylic acids may also be used in the form of their anhydrides. In such circumstances, specific examples thereof include phthalic anhydride, succinic anhydride, tetrahydrophthalic anhydride, hexahydrophthalic anhydride, himic acid anhydride, maleic anhydride, trimellitic anhydride, pyromellitic anhydride, and the like.

The hydroxyl group-containing compound used in the polyester resin synthesis is normally a polyhydric alcohol having two or more hydroxyl groups per molecule, examples of which include glycols such as ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butylene glycol, 1,4-butanediol, 1,5-pentanediol, 1,6-hexanediol, 2-butyl-2-ethyl-1,3-propanediol, methylpropanediol, cyclohexanedimethanol, and 3,3-diethyl-1,5-pentanediol. Furthermore, in order to achieve a balance between performance and paint film hardness in particular, there can preferably be employed a trihydric or higher polyol, such as glycerol, trimethylolethane, trimethylolpropane, pentaerythritol, or dipentaerythritol. These polyhydric alcohols can be used on their own or a combination of two or more may be employed together.

The water-soluble or water-dispersible polyester resin (A) of the present invention contains 7-20 mass %, based on the resin solids content of component (A), of (a) a glycol monoalkyl ether containing a $C_{1-3}$ alkoxy group.

Generally speaking, with polyester resins, handling is possible if the viscosity is lowered using an organic solvent but there is the problem that sagging tends to arise along with the lowering of resin viscosity when preparing a paint.

In the present invention, by using a glycol monoalkyl ether which contains a $C_{1-3}$ alkoxy group, it is possible to maintain sufficient sagging resistance when preparing the paint despite this lowering of the viscosity of the polyester resin.

The $C_{1-3}$ alkoxy group-containing glycol monoalkyl ether (a) employed in the present invention is represented by the following general formula (1).

$$R^1O\text{---}(R^2\text{---}O)_n\text{---}H \qquad (1)$$

(In the formula, $R^1$ represents a $C_{1-3}$ alkyl group, $R^2$ represents a $C_{2-4}$ alkylene group, and n is an integer with a value of 1 or more.)

$R^1$ is the methyl group, ethyl group or propyl group, preferably the methyl group or ethyl group, and more preferably the methyl group. If $R^1$ is an alkyl group with 4 or more carbons, sufficient sagging resistance may not be obtained.

$R^2$ is a $C_{2-4}$ alkylene group, with a $C_{2-3}$ alkylene group being preferred, and a $C_3$ alkylene group being particularly preferred. If $R^2$ is an alkylene group with 5 or more carbons, sufficient sagging resistance may not be obtained.

Moreover, if the number of repetitions of ($R^2$—O), which is the glycol repeating unit in component (a), is too great then this component may not evaporate off at the time of hot curing and therefore remain in the coated film, so the range 1 to 5 is preferred and the range 1 to 3 more preferred.

Specific examples of (a), the glycol monoalkyl ether containing a $C_{1-3}$ alkoxy group employed in the present invention, are the monoalkyl ethers of glycol compounds such as ethylene glycol, diethylene glycol, triethylene glycol, propylene glycol, dipropylene glycol, and tripropylene glycol. Of these, in terms of the effect described above, the use of propylene glycol monomethyl ether, dipropylene glycol monomethyl ether, or tripropylene glycol monomethyl ether is preferred.

The proportion of component (a) in the (A) component employed in the present invention lies in the range 7 to 20 mass % based on the mass of resin solids in component (A). If the proportion of component (a) is less than 7 mass %, the effect of component (a) is not adequately manifested, the viscosity of the polyester resin is not reduced, and handling is difficult, while if an organic solvent other than component (a) is added it may not be possible to maintain the sagging resistance. On the other hand, if the proportion of component (a) is more than 20 mass %, there may be a reduction in the sagging resistance.

Hereinafter, the polyester resin containing component (a) is sometimes referred to as the polyester resin varnish.

The water-soluble or water-dispersible polyester resin (A) used in the present invention is rendered waterborne by adding a secondary and/or tertiary amine to the polyester resin varnish and neutralizing the acid groups in the polyester resin.

Examples of the secondary and tertiary amines employed in the present invention are one or mixtures of two or more secondary and tertiary amines from amongst alkanolamines such as N-methylethanolamine, N-ethylethanolamine, N,N-dimethylethanolamine, N,N-diethylethanolamine, and N-methyldiethanolamine, alkylamines such as diethylamine, and triethylamine, and morpholines such as morpholine, and N-methylmorpholine. Of these, N,N-dimethylethanolamine and N-methyldiethanolamine are preferred.

The reason for not using a primary amine in the present invention is that the basicity is too high and there is a concern that the melamine resin curing reaction will be impeded.

The added amount of the secondary and/or tertiary amine is preferably from 70 to 110 mol %, and more preferably from 80 to 100 mol %, in terms of the acid groups in the polyester resin.

In the present invention, the polyester resin (A) is water soluble or water dispersible, and it is dissolved or dispersed in the aqueous medium of the waterborne mid-coat paint composition.

A melamine resin (B) is included in the waterborne mid-coat paint composition of the present invention as a curing agent.

The melamine resin which constitutes the component (B) used in the present invention comprises a methylated melamine resin and a methyl/butyl mixed alkylated melamine resin, where the proportion by mass of the methylated melamine resin in terms of the methyl/butyl mixed alkylated melamine resin, based on the solids content, is between 50/50 and 90/10, with the range 60/40 to 80/20 being preferred in terms of appearance and sagging resistance.

If the proportion of the methyl/butyl mixed alkylated melamine resin contained in the total melamine resin is less than 10 mass %, sufficient sagging resistance may not be obtained.

On the other hand, if the proportion of the methyl/butyl mixed alkylated melamine resin included in the total melamine resin exceeds 50 mass %, the appearance may be impaired.

Butylated melamine resin is too strongly hydrophobic for use in the inventive waterborne mid-coat paint composition, so is not suitable in the present invention.

Examples of the methylated melamine resin include wholly-methylated melamines such as Cymel 300, Cymel 301, Cymel 303, Cymel 350 (these are produced by Nihon Cytec Industries Inc.), Luwipal 066 (produced by BASF), Maprenal MF900, Maprenal MF904, Resimene 745, Resimene 747 (these are produced by the Ineos Melamines Co.), and methylated melamines which also contain imino or methylol groups such as Cymel 325, Cymel 327, Cymel 703, Cymel 712, Cymel 715 (these are produced by Nihon Cytec Industries Inc.), Luwipal 072, Luwipal 073 (these are produced by BASF), Maprenal VMF3950, Resimene 717, Resimene 718, Resimene 730, Resimene 735, and Resimene 741 (these are produced by the Ineos Melamines Co.).

The methyl/butyl mixed alkylated melamine resin preferably has a molar ratio of methyl to butyl groups of from 70/30 to 60/40. Examples of the methyl/butyl mixed alkylated melamine resin employed in the present invention include the Nihon Cytec Industries Inc. products Cymel 235 (a wholly-alkylated melamine, in which the methyl group/butyl group molar ratio=60/40), Cymel 211 (a methyl/butyl mixed alkylated melamine resin containing imino groups, in which the methyl group/butyl group molar ratio=70/30), Cymel 254 (a methyl/butyl mixed alkylated melamine resin containing imino groups, in which the methyl group/butyl group molar ratio=60/40) and Cymel 202 (a methyl/butyl mixed alkylated melamine resin containing imino groups and methylol groups, in which the methyl group/butyl group molar ratio=60/40).

The proportion of the waterborne polyester resin (A) used in the present invention in terms of the melamine resin (B), based on the resin solids content by mass, is from 70/30 to 90/10, and preferably from 73/27 to 82/18.

If the proportion of the melamine resin (B) in terms of the combined solids contents of the polyester resin (A) and melamine resin (B) exceeds 30 mass %, then there may be a lowering in the adhesion in terms of the top-coat paint film. On the other hand, if the proportion of the melamine resin (B) is less than 10 mass %, adequate paint film hardness may not be obtained due to poor curing.

The waterborne mid-coat paint composition of the present invention also contains polypropylene glycol (C) for the purposes of enhancing the appearance. The number average molecular weight of the polypropylene glycol (C) in the present invention is between 400 and 1,200 and, for reasons of appearance, preferably between 900 and 1,100. If the number average molecular weight is less than 400, component (C) is driven off at the time of the hot curing, so there is insufficient enhancement in appearance. On the other hand, if the number average molecular weight exceeds 1,200, no appearance-enhancing effect is obtained.

The content of polypropylene glycol (C) in the present invention is between 1 and 10 mass % in terms of the combined mass of the component (A) and component (B) resin solids contents and, in terms of appearance, preferably between 3 and 7 mass %. If the amount of polypropylene glycol is more than 10 mass %, there may be a lowering in the paint film hardness. On the other hand, with less than 1 mass %, sufficient appearance enhancement may not be obtained.

Optionally, pigment may also be added to the waterborne mid-coat paint composition of the present invention. As examples of the pigment components which can be added, there are coloring pigments such as chrome yellow, yellow iron oxide, iron oxide, carbon black, titanium dioxide, azo chelate pigments, insoluble azo pigments, condensed azo pigments, phthalocyanine pigments, indigo pigments, perinone pigments, perylene pigments, dioxane pigments, quinacridone pigments, isoindolinone pigments, and metal complex pigments, and fillers such as calcium carbonate, baryta, precipitated barium sulfate, clay, talc, and the like.

In the case where pigments are added to the waterborne mid-coat paint composition of the present invention, from the point of view of paint color control and chipping resistance it is preferred that the content thereof lies in the range from 30 to 200 mass % in terms of the combined mass of the component (A) and component (B) resin solids contents.

Besides the above components, the waterborne mid-coat paint composition of the present invention may also optionally include one or more of the polyurethane resins, organic solvents, hardening/curing catalysts, surface modifiers, defoaming agents, plasticizers, film-forming adjuvants, ultraviolet light absorbers, antioxidants, and the like known to those skilled in the art.

There are no particular restrictions on the method for obtaining the waterborne mid-coat paint composition of the present invention, and there may be employed any of the methods known to those skilled in the art such as kneading a mixture of the aforesaid resins and pigments, etc., and performing dispersion using a ball mill, sand mill, disperser, or the like.

The waterborne mid-coat paint composition of the present invention normally already includes an aqueous medium but, depending on the circumstances, dilution may be carried out to a suitable viscosity by the addition of further water medium or by means of a small amount of organic solvent or amine, prior to supply as the paint. Examples of the aqueous medium include deionized water, and the like.

Methods normally used in the application of a mid-coat paint in the automotive industry may be suitably applied as the coating method, such as air spray coating, air atomized electrostatic coating, rotational bell atomized electrostatic coating, and the like.

Following the prior application of an undercoat comprising an electrodeposition coating material and/or a sealing material, etc., to the motor vehicle body, the waterborne mid-coat paint composition of the present invention is applied so as to give a cured thickness of 5 to 100 μm, and preferably 10 to 60 μm, following which hot curing is performed at 100-200° C., preferably at 120-180° C., for a suitable time, such as between 10 minutes and 1 hour, and a cured paint film is obtained.

EXAMPLES

The present invention is explained in further detail below by means of examples but the invention is not to be restricted to these. Unless specified otherwise, any references in the examples to parts, % and ratio are to be taken to mean parts by mass, mass % and mass ratio respectively.

Production Example 1

Production of Water-Soluble or Water-Dispersible Polyester Resin A1

12.9 parts of trimethylolpropane, 20.0 parts of 1,6-hexanediol, 12.0 parts of neopentyl glycol, 20.1 parts of adipic acid, and 30.0 parts of isophthalic acid were introduced into a four-necked flask equipped with a reflux condenser, thermometer, stirring means and nitrogen inlet tube, and the temperature was raised to 150° C., after which it was further raised to 230° C. over 3.5 hours and condensation accompanied by the elimination of water was carried out until the resin acid value fell below 10. Subsequently, the reaction temperature was lowered to 140° C. and, after introducing 5.0 parts of trimellitic anhydride, the temperature was raised to 160° C. and this reaction temperature was then maintained for 30 minutes. Next, the temperature was increased to 180° C. and the reaction continued at this temperature. Once the resin acid value had attained the planned acid value of 28, the reaction temperature was lowered to 120° C. and 10.0 parts of dipropylene glycol monomethyl ether was added. Following this, after cooling to 50° C., 4.2 parts of dimethylethanolamine was slowly added while stirring and then thorough stirring was performed, after which 165.3 parts of deionized water was added and well-mixed therein, and water-soluble or water-dispersible polyester resin A1 was obtained. The properties of the polyester resin varnish were as follows:—residue on heating 33.0 mass %, resin acid value 28 mgKOH/g, hydroxyl group value 120 mgKOH/g, and number average molecular weight measured by GPC based on polystyrene conversion 1,490.

Production Examples 2 to 11

Production of Water-Soluble or Water-Dispersible Polyester Resins A2 to A11

Water-soluble or water-dispersible polyester resins A2 to A11 were obtained by the same method as in Production Example 1 based on the formulations shown in Table 1. The properties of the water-soluble or water-dispersible polyester resins obtained, and the results of an evaluation of the stability of these water-soluble or water-dispersible polyester resins, are shown in Table 1 and Table 2.

With regard to the stability of the water-soluble or water-dispersible polyester resins obtained, said water-soluble or water-dispersible polyester resins were left in a constant temperature chamber at 40° C. and then an evaluation was performed based on the following criteria.

x: settles-out after leaving for one month

◯: no settling-out noted after one month but settling-out observed after two months ◉: no settling-out noted even after two months

TABLE 1

| | Water-soluble or water-dispersible polyester resin (A) | | | | | |
|---|---|---|---|---|---|---|
| | A1 | A2 | A3 | A4 | A5 | A6 |
| Trimethylolpropane | 12.9 | 12.9 | 12.9 | 12.5 | 12.9 | 14.2 |
| 1,6-Hexanediol | 20.0 | 20.0 | 20.0 | 20.0 | 20.0 | 20.0 |
| Neopentyl glycol | 12.0 | 12.0 | 12.0 | 12.5 | 12.0 | 10.3 |
| Adipic acid | 20.1 | 20.1 | 20.1 | 19.9 | 20.1 | 20.5 |
| Isophthalic acid | 30.0 | 30.0 | 30.0 | 30.0 | 30.0 | 30.0 |
| Trimellitic anhydride | 5.0 | 5.0 | 5.0 | 5.0 | 5.0 | 5.0 |
| Dipropylene glycol monomethyl ether | 10.0 | | | 10.0 | | |
| Monopropylene glycol monomethyl ether | | 10.0 | | | | |
| Tripropylene glycol monomethyl ether | | | 10.0 | | | |
| Dipropylene glycol monoethyl ether | | | | | 8.0 | |
| Tripropylene glycol mono-n-propyl ether | | | | | | 18.0 |
| Diethylene glycol monobutyl ether | | | | | | |
| Butyl Cellosolve | | | | | | |
| Proportion by mass of component (a) in the (A) component | 10.8 | 10.8 | 10.8 | 10.8 | 8.7 | 19.5 |
| Dimethylethanolamine | 4.2 | 4.2 | 4.2 | 3.9 | 4.2 | 5.1 |
| Deionized water | 165.3 | 165.3 | 165.3 | 165.5 | 165.3 | 156.5 |
| Total amount introduced | 279.5 | 279.5 | 279.5 | 279.3 | 277.5 | 279.6 |
| Acid value (mgKOH/g) | 28 | 28 | 28 | 26 | 28 | 34 |
| OHV (mgKOH/g) | 120 | 120 | 120 | 120 | 120 | 120 |
| Number average molecular weight | 1490 | 1370 | 1620 | 1720 | 1820 | 1590 |
| Residue on heating (mass %) | 33.0 | 33.0 | 33.0 | 33.0 | 33.0 | 33.0 |
| Stability of the water-soluble or water-dispersible polyester resin | ○ | ○ | ○ | ○ | ○ | ◎ |

TABLE 2

| | Water-soluble or water-dispersible polyester resin (A) | | | | |
|---|---|---|---|---|---|
| | A7 | A8 | A9 | A10 | A11 |
| Trimethylolpropane | 11.7 | 15.1 | 12.9 | 12.9 | 12.9 |
| 1,6-Hexanediol | 20.0 | 20.0 | 20.0 | 20.0 | 20.0 |
| Neopentyl glycol | 13.7 | 9.2 | 12.0 | 12.0 | 12.0 |
| Adipic acid | 19.7 | 20.7 | 20.1 | 20.1 | 20.1 |
| Isophthalic acid | 30.0 | 30.0 | 30.0 | 30.0 | 30.0 |
| Trimellitic anhydride | 5.0 | 5.0 | 5.0 | 5.0 | 5.0 |
| Dipropylene glycol monomethyl ether | | | | | |
| Monopropylene glycol monomethyl ether | | | | | |
| Tripropylene glycol monomethyl ether | | | | | |
| Dipropylene glycol monoethyl ether | 10.0 | 10.0 | | 5.0 | 22.0 |
| Tripropylene glycol mono-n-propyl ether | | | | | |
| Diethylene glycol monobutyl ether | | | 10.0 | | |
| Butyl Cellosolve | | | | 5.0 | |
| Proportion by mass of component (a) in the (A) component | 10.8 | 10.8 | 10.8 | 5.3 | 22.9 |
| Dimethylethanolamine | 3.3 | 5.7 | 4.2 | 4.2 | 4.2 |
| Deionized water | 166.0 | 164.0 | 165.3 | 170.3 | 165.3 |
| Total amount introduced | 279.4 | 279.7 | 279.5 | 284.5 | 291.5 |
| Acid value (mgKOH/g) | 22 | 38 | 28 | 28 | 28 |
| OHV (mgKOH/g) | 120 | 120 | 120 | 120 | 120 |
| Number average molecular weight | 1690 | 1700 | 1720 | 1610 | 1600 |
| Residue on heating (mass %) | 33.0 | 33.0 | 33.0 | 33.0 | 33.0 |
| Stability of the water-soluble or water-dispersible polyester resin | X | ◎ | ○ | ○ | ○ |

Paint Production Example 1

Production of Waterborne Mid-Coat Paint Composition WBP1

54.1 parts of water-soluble or water-dispersible polyester resin aqueous solution A1, 13.7 parts of deionized water, 13.7 parts of titanium oxide, 10.2 parts of barium sulfate, 1.1 part of talc, and 0.1 part of carbon black were introduced into a dispersion container, and then a coating material paste was prepared by performing dispersion until the particle size was no more than 10 μm. Next, 4.2 parts of a wholly-methylated melamine resin (commercial name "Cymel 303", produced by Nihon Cytec Industries Inc., residue on heating 100 mass %), 1.8 parts of a methyl/butyl mixed alkylated melamine resin (commercial name "Cymel 235", produced by Nihon Cytec Industries Inc., residue on heating 100 mass %, methyl/butyl ratio (molar ratio) 60/40), and 1.2 parts of polyoxypropylene glycol (commercial name "Uniol TG-1000", manufactured by the NOF Corporation, number average molecular weight 1,000) as the polypropylene glycol were added, and uniformly stirred together, to obtain waterborne mid-coat paint composition WBP1.

Paint Production Examples 2 to 22

Production of Waterborne Mid-Coat Paint Compositions WBP2 to 22

Waterborne mid-coat paint compositions WBP2 to 22 were prepared in the same way as in Paint Production Example 1 based on the formulations shown in Table 3 and Table 4.

When applying the waterborne mid-coat paint compositions of the present invention in the examples and comparative examples below, dilution was carried out by the addition of deionized water to waterborne mid-coat paint compositions WBP1 to 22 so that the viscosity when measured by means of a Ford Cup No 4 was 50 seconds (20° C.).

TABLE 3

| | WBP 1 | WBP 2 | WBP 3 | WBP 4 | WBP 5 | WBP 6 |
|---|---|---|---|---|---|---|
| water-soluble or water-dispersible polyester resin A1 | 54.1 | | | | | |
| water-soluble or water-dispersible polyester resin A2 | | 54.1 | | | | |
| water-soluble or water-dispersible polyester resin A3 | | | 54.1 | | | |
| water-soluble or water-dispersible polyester resin A4 | | | | 54.1 | | |
| water-soluble or water-dispersible polyester resin A5 | | | | | 54.1 | |
| water-soluble or water-dispersible polyester resin A6 | | | | | | 54.1 |
| water-soluble or water-dispersible polyester resin A8 | | | | | | |
| water-soluble or water-dispersible polyester resin A9 | | | | | | |
| water-soluble or water-dispersible polyester resin A10 | | | | | | |
| water-soluble or water-dispersible polyester resin A11 | | | | | | |
| deionized water | 13.7 | 13.7 | 13.7 | 13.7 | 13.7 | 13.7 |
| titanium dioxide | 13.7 | 13.7 | 13.7 | 13.7 | 13.7 | 13.7 |
| barium sulfate | 10.2 | 10.2 | 10.2 | 10.2 | 10.2 | 10.2 |
| talc | 1.1 | 1.1 | 1.1 | 1.1 | 1.1 | 1.1 |
| carbon black | 0.1 | 0.1 | 0.1 | 0.1 | 0.1 | 0.1 |
| methylated melamine resin (*1) | 4.2 | 4.2 | 4.2 | 4.2 | 4.2 | 5.1 |
| methyl/butyl mixed alkylated melamine resin (*2) | 1.8 | 1.8 | 1.8 | 1.8 | 1.8 | 0.9 |
| component (A)/component (B) (solids content mass ratio) | 75/25 | 75/25 | 75/25 | 75/25 | 75/25 | 75/25 |
| methylated melamine resin/(methyl/butyl mixed alkylated melamine resin) (solids content mass ratio) | 70/30 | 70/30 | 70/30 | 70/30 | 70/30 | 85/15 |
| polypropylene glycol (*3) | | | | | | |
| polypropylene glycol (*4) | | | | | | |
| polypropylene glycol (*5) | 1.2 | 1.2 | 1.2 | 1.2 | 1.2 | 1.2 |
| polypropylene glycol (*6) | | | | | | |
| polypropylene glycol (*7) | | | | | | |
| proportion of (C) component by mass (in terms of the combined amount of the (A) and (B) components) | 5.0 | 5.0 | 5.0 | 5.0 | 5.0 | 5.0 |
| total mass | 100.0 | 100.0 | 100.0 | 100.0 | 100.0 | 100.0 |

TABLE 4

| | WBP 7 | WBP 8 | WBP 9 | WBP 10 | WBP 11 |
|---|---|---|---|---|---|
| water-soluble or water-dispersible polyester resin A1 | | | | | 54.1 |
| water-soluble or water-dispersible polyester resin A2 | | | | | |
| water-soluble or water-dispersible polyester resin A3 | | | | | |
| water-soluble or water-dispersible polyester resin A4 | | | | | |
| water-soluble or water-dispersible polyester resin A5 | | | | | |
| water-soluble or water-dispersible polyester resin A6 | | | | | |
| water-soluble or water-dispersible polyester resin A8 | 54.1 | | | | |
| water-soluble or water-dispersible polyester resin A9 | | 54.1 | | | |
| water-soluble or water-dispersible polyester resin A10 | | | 54.1 | | |
| water-soluble or water-dispersible polyester resin A11 | | | | 54.1 | |
| deionized water | 13.7 | 13.7 | 13.7 | 13.7 | 13.7 |
| titanium dioxide | 13.7 | 13.7 | 13.7 | 13.7 | 13.7 |
| barium sulfate | 10.2 | 10.2 | 10.2 | 10.2 | 10.2 |
| talc | 1.1 | 1.1 | 1.1 | 1.1 | 1.1 |
| carbon black | 0.1 | 0.1 | 0.1 | 0.1 | 0.1 |
| methylated melamine resin (*1) | 4.2 | 4.2 | 4.2 | 4.2 | 5.7 |
| methyl/butyl mixed alkylated melamine resin (*2) | 1.8 | 1.8 | 1.8 | 1.8 | 0.3 |
| component (A)/component (B) (solids content mass ratio) | 75/25 | 75/25 | 75/25 | 75/25 | 75/25 |
| methylated melamine resin/(methyl/butyl mixed alkylated melamine resin) (solids content mass ratio) | 70/30 | 70/30 | 70/30 | 70/30 | 95/5 |
| polypropylene glycol (*3) | | | | | |
| polypropylene glycol (*4) | | | | | |
| polypropylene glycol (*5) | 1.2 | 1.2 | 1.2 | 1.2 | 1.2 |
| polypropylene glycol (*6) | | | | | |
| polypropylene glycol (*7) | | | | | |
| proportion of (C) component by mass (in terms of the combined amount of the (A) and (B) components) | 5.0 | 5.0 | 5.0 | 5.0 | 5.0 |
| total mass | 100.0 | 100.0 | 100.0 | 100.0 | 100.0 |

The melamine resins and polypropylene glycols shown in Tables 3 and 4 were as follows.

Methylated melamine resin (*1): Cymel 303 (commercial name, produced by Nihon Cytec Industries Inc.)

Methyl/butyl mixed alkylated melamine resin (*2): Cymel 235 (commercial name, produced by Nihon Cytec Industries Inc.)

Polypropylene glycol (*3): Uniol D-250 (commercial name, produced by the NOF Corporation, number average molecular weight 250)

Polypropylene glycol (*4): Pluriol P400 (commercial name, produced by BASF, number average molecular weight 400)

Polypropylene glycol (*5): Uniol TG-1000 (commercial name, produced by the NOF Corporation, number average molecular weight 1000)

Polypropylene glycol (*6): Uniol D-1200 (commercial name, produced by the NOF Corporation, number average molecular weight 1200)

Polypropylene glycol (*7): Pluriol P2000 (commercial name, produced by the NOF Corporation, number average molecular weight 2000)

Example 1

Evaluations of the undermentioned properties of waterborne mid-coat paint composition WBP1 were carried out with the temperature and humidity conditions at the time of the application of said waterborne mid-coat paint composition WBP1 (referred to below as the application conditions) set at 25° C. (temperature) and 75% (humidity).

Moreover, in the evaluations of the appearance and of the adhesion to the top-coat, the conditions at the time of the application of the waterborne colored basecoat paint and of the basecoat coating material were made to be 25° C. (temperature) and 75% (humidity). These application conditions were also the same in the case of Examples 2-12 and Comparative Examples 1-12 described below, irrespective of the particular conditions used for the application of the mid-coat paint composition.

(1) Coated Film Appearance, and the Adhesion to the Top-Coat

Electrodeposition coating of a zinc phosphate treated mild steel plate was performed using a cationic electrodeposition paint (commercial name "Aqua No. 4200", produced by BASF Coatings Japan Ltd) so as to give a dry paint film thickness of 20 μm, and then baking was carried out for 25 minutes at 175° C. to produce the electrodeposition-coated plate used in the evaluations (hereinafter referred to as the 'ED plate').

Using a rotary atomizer type bell coating device (commercial name "Metallic Bell G1-COPES Bell" produced by the ABB Co.), the ED plate was painted with the inventive waterborne mid-coat paint WBP1 to give a dry film thickness of 25 μm. Following the painting, the plate was left for 7 minutes at room temperature and then 3 minutes flash-off was carried out at 80° C., following which baking was performed for 30 minutes at 140° C. and the mid-coat paint film plate was obtained. Next, there was applied a waterborne colored basecoat paint (commercial name "Aqua BC-3", produced by BASF Coatings Japan Ltd, silver color) to give a dry film thickness of 15 μm. Following the painting, the plate was left for 3 minutes at room temperature, and then 10 minutes flash-off was carried out at 80° C. After cooling to room temperature, a clearcoat paint (commercial name "Belcoat No. 6100", produced by BASF Coatings Japan Ltd) was applied to give a dry film thickness of 30 μm. Following the painting, the plate was left for 10 minutes at room temperature and then baking was carried out for 30 minutes at 140° C., to obtain the evaluation plate.

(1-1) Appearance

The appearance of the paint film on the evaluation plate was evaluated as follows by eye.

⊚: smooth, extremely good
○: smooth, good
x: rough, orange peel regions (1-2) Adhesion in Terms of the Topcoat Paint Film Using a cutter knife, a cross-hatch pattern of one hundred 2 mm×2 mm squares was formed in the paint film on the evaluation plate obtained, then adhesive tape (Sellotape) was firmly affixed to the cross-hatch regions and the end of the tape was quickly pulled away at an angle of 45° C., after which the state of the cross-hatch pattern was noted and evaluated as follows.

◯: absolutely no peeling of the paint film noted
x: peeling of the paint film observed (2) Sagging Resistance A rectangular shaped ED plate (10 cm×45 cm) with punch holes (of 5 mm diameter) introduced at a 3 cm spacing running in the lengthwise direction, was set upright perpendicular to the ground and with the punch holes in the test plate arranged running parallel with the ground. Using a rotary atomizer type bell coating device (commercial name "Metallic Bell G1-COPES Bell" produced by the ABB Co.), this ED plate was painted using waterborne mid-coat paint composition WBP1 in a slanting fashion such that the thickness of the dry paint film gradually increased from 20 μm to 60 μm along the test plate in the lengthwise direction. Following the painting, the plate was left for 7 minutes at room temperature and then 3 minutes flash-off was carried out at 80° C., after which baking was performed for 30 minutes at 140° C. and the evaluation plate was obtained. The evaluation plate was then observed, the dry film thickness was measured when the distance from the punch hole bottom region to the sagging end point was 5 mm, and evaluation was performed as follows.

◉: 45 μm or more
◯: at least 35 μm but less than 45 μm
x: less than 35 μm (3) Paint Film Hardness Using a rotary atomizer type coating device (commercial name "Metallic Bell G1-COPES Bell" produced by the ABB Co.), the ED plate was painted using the inventive waterborne mid-coat paint WBP1 to give a dry film thickness of 25 μm. Following the painting, the plate was left for 7 minutes at room temperature and then 3 minutes flash-off was carried out at 80° C., following which baking was performed for 30 minutes at 140° C. and the evaluation plate was obtained.

The hardness of the paint film on the evaluation plate obtained was evaluated in the following manner by means of the pencil scratch test method (JIS-K5400).

◯: at least F
x: HB or less

Example Nos 2 to 12

Comparative Examples 1 to 12

The properties of waterborne mid-coat paint compositions WBP2 to 22 shown in Table 3 and Table 4 were evaluated by the same method as Example 1 using the waterborne mid-coat paint coating conditions shown in Table 5 and Table 6. The standard, low temperature/high humidity, and high temperature/low humidity conditions referred to in Table 5 and Table 6 are specifically the following conditions.

Standard: 25° C. (temperature), 75% (humidity)
Low temperature/high humidity: 18° C. (temperature), 85% (humidity)
High temperature/low humidity: 35° C. (temperature), 60% (humidity)

TABLE 5

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| waterborne mid-coat paint composition | WBP 1 | WBP 1 | WBP 1 | WBP 2 | WBP 3 | WBP 4 | WBP 5 | WBP 6 | WBP 13 | WBP 16 | WBP 19 | WBP 20 |
| coating conditions | standard | low-T high-H | high-T low-H | low-T high-H | low-T high-H | standard | low-T high-H | low-T high-H | standard | high-T low-H | high-T low-H | standard |
| sagging resistance | ◉ | ◉ | ◉ | ◉ | ◉ | ◉ | ◉ | ◯ | ◉ | ◉ | ◉ | ◉ |
| appearance | ◉ | ◉ | ◉ | ◉ | ◉ | ◉ | ◉ | ◉ | ◉ | ◯ | ◯ | ◉ |
| paint film hardness | ◯ | ◯ | ◯ | ◯ | ◯ | ◯ | ◯ | ◯ | ◯ | ◯ | ◯ | ◯ |
| adhesion in terms of topcoat | ◯ | ◯ | ◯ | ◯ | ◯ | ◯ | ◯ | ◯ | ◯ | ◯ | ◯ | ◯ |

TABLE 6

| | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| waterborne mid-coat paint composition | WBP 7 | WBP 8 | WBP 9 | WBP 10 | WBP 11 | WBP 12 | WBP 14 | WBP 15 | WBP 17 | WBP 18 | WBP 21 | WBP 22 |
| coating conditions | low-T high-H | low-T high-H | low-T high-H | low-T high-H | low-T high-H | high-T low-H | standard | standard | high-T low-H | high-T low-H | high-T low-H | standard |
| sagging resistance | X | X | X | X | X | ◉ | ◉ | ◉ | ◉ | ◉ | ◉ | ◉ |
| appearance | ◉ | ◉ | ◉ | ◉ | ◉ | X | ◉ | X | X | X | X | ◉ |
| paint film hardness | ◯ | ◯ | ◯ | ◯ | ◯ | ◯ | ◯ | X | ◯ | ◯ | ◯ | X |
| adhesion in terms of topcoat | ◯ | ◯ | ◯ | ◯ | ◯ | ◯ | X | ◯ | ◯ | ◯ | ◯ | ◯ |

The waterborne mid-coat paint composition of the present invention can be employed as a mid-coat paint in various fields but, in particular, can be advantageously employed as a motor vehicle mid-coat paint.

The invention claimed is:

1. A waterborne mid-coat paint composition comprising (A) a water-soluble or water-dispersible polyester resin, (B) a melamine resin, and (C) polypropylene glycol, where component (A) comprises a polyester resin made waterborne by adding 7-20 mass %, based on the resin solids content of component (A), of (a) a $C_{1-3}$ alkoxy group-containing glycol monoalkyl ether to a polyester resin of resin acid value 25-35 mgKOH/g and then neutralizing with a secondary amine and/or tertiary amine, and component (B) comprises a methylated melamine resin and a methyl/butyl mixed alkylated melamine resin, and the content ratio based on resin solids content by mass of the methylated melamine resin to the methyl/butyl mixed alkylated melamine resin is between 50/50 and 90/10, and the content ratio based on resin solids content by mass of component (A) to component (B) is from 70/30 to 90/10, and component (C) comprises a number average molecular weight of between 400 and 1,200, and the content of component (C) by mass percentage is between 1 and 10 mass % in terms of the combined resin solids contents of component (A) and component (B).

2. The waterborne mid-coat paint composition of claim 1 where the content ratio, by mass, of methylated melamine resin to methyl/butyl mixed alkylated melamine resin in component (B), based on solids content, is between 60/40 and 80/20.

3. The waterborne mid-coat paint composition of claim 1 where the number average molecular weight of aforesaid component (C) is between 900 and 1,100.

* * * * *